United States Patent Office

3,518,313
Patented June 30, 1970

3,518,313
METHOD OF STABILIZING AQUEOUS FORMALDEHYDE
Akihiko Iida, Chiba-shi, and Iwao Maruta, Ichikawa-shi, Japan, assignors to Kao Soap Co., Ltd., Chuo-ku, Tokyo, Japan, a corporation of Japan
No Drawing. Filed Mar. 20, 1967, Ser. No. 624,186
Claims priority, application Japan, Apr. 5, 1966, 41/21,354
Int. Cl. C07c 45/24
U.S. Cl. 260—606      3 Claims

ABSTRACT OF THE DISCLOSURE

A method of stabilizing aqueous formaldehyde solutions by adding thereto a water solubilized high molecular weight substance obtained by mixing and dissolving in a concentrated aqueous solution of an anionic surface active agent a water insoluble acetal of polyvinyl alcohol selected from the group consisting of polyvinyl formal, polyvinyl acetacetal and polyvinyl butyral.

FIELD OF THE INVENTION

This invention relates to a method of stabilizing aqueous formaldehyde to obtain an aqueous solution of formaldehyde which is low in methanol content and is comparatively high in concentration and is stable even at a low temperature.

DESCRIPTION OF THE PRIOR ART

Generally formaldehyde is marketed as an aqueous solution of a comparatively high concentration, such as about 37%. However, it is well known that, in such case, if the temperature of the solution is reduced, when it is cold a white precipitate will be produced, namely the so-called paraformaldehyde. Needless to say, the production of such a precipitate is not desirable to the use of an aqueous solution of formaldehyde.

Therefore, in order to prevent the production of such precipitate, there has been already adopted methods wherein the concentration of formaldehyde in the solution is kept below 37%, methanol is added to the formaldehyde solution so as to make the concentration of methanol about 15% or the formaldehyde solution is kept at such a high temperature that no white precipitate will be produced. However, such methods are not generally desirable for use in industry. Further, as another measure, it has been attempted to add a substance to prevent precipitation. For such purpose, there have already been used esters of polyhydric alcohols, such as, for example, pentaerythritol, polyethylene glycol and sorbitol; and higher fatty acids, such as stearic acid, palmitic acid and oleic acid; ethers and acetals of such polyhydric alcohols; such higher alcohols as heptanol, octanol and decanol; hydroquinone, polyvinyl alcohol and esters and acetals thereof with fatty acids. There have also been used compounds having short chain ether bonding radicals in polyhydric alcohols esterified by long chain fatty acids or compounds of long chain amides or amine chains with polyoxyethylene glycols. There are also used guanamine derivatives. However, these known methods have defects that the amount of the substance to be added is too large, that the effect is not sufficient and that the cost of the treating process is high.

SUMMARY OF THE INVENTION

According to the present invention, there is provided a more effective and simple method of stabilizing aqueous formaldehyde. The present invention provides a method of stabilizing aqueous formaldehyde solutions characterized by adding to an aqueous formaldehyde solution a very slight amount of a water solubilized high molecular weight substance obtained by water solubilizing a water insoluble acetal or polyvinyl alcohol, such as polyvinyl formal, polyvinyl acetacetal and polyvinyl butyral, with a concentrated anionic surface active agent.

It is well known that when an aliphatic aldehyde, such as formaldehyde or acetaldehyde, is made to react with a polyvinyl alcohol, an acetal will be produced. In such case, if the reaction conditions are properly selected, a product insoluble in water and formalin will be obtained. Further, a product insoluble in methanol or any other organic solvent can be obtained. However, even an acetal which not only is insoluble in water and formalin but also does not dissolve even in an organic solvent, such as methanol, can be dissolved in a concentrated solution of an anionic surface active agent thereby producing a water solubilized acetal which can be diluted with water at any ratio. In this invention, such water-solubilized acetals are used as a stabilizer for aqueous formaldehyde solutions.

The polyvinyl acetal to be used in order to make a water solubilized acetal in the present invention should have a polymerization degree of 100 to 2,000, that is, it should contain from 100 to 2,000 vinyl alcohol units in one molecule, and 25 to 95 mol percent of the hydroxyl radical of the polyvinyl alcohol should be acetalized and should be insoluble in water and formalin. Among the anionic surface active agents that can be used in order to solubilize such acetals are fatty acid alkali salts, such as sodium laureate, alkyl sulfuric acid alkali salts, such as sodium dodecyl sulfate, alkyl benzene sulfonic acid alkali salts, such as sodium dodecyl benzene sulfonate, alkyl naphthalene sulfonic acid alkali salts, such as sodium butyl naphthalene sulfonate, alkyl sulfonic acid alkali salts, such as sodium dodecyl sulfonate and alkenyl sulfonic acid salts. Needless to say, mixtures of them might also be used.

It is assumed that, when a polyvinyl acetal insoluble in water and formalin, as is mentioned above, is made soluble in an anionic surface active agent, such as those mentioned above, the polyvinyl acetal and the anionic surface active agent will form an adsorbed complex in the produced water solubilized acetal which will act as an excellent stabilizer for aqueous formaldehyde.

The use of such an adsorbed complex in the present invention is entirely different from the already known addition of water soluble or formalin soluble polyvinyl acetal to an aqueous solution of formaldehyde and, according to the present invention, it has been found that a higher and unexpected stabilizing effect will be obtained as compared with such a conventional method. Further, in the conventional method, there have been required troublesome operations in that water soluble polyvinyl formal or polyvinyl butyral is added, is kept at a high temperature, such as 60 or 80° C., for 30 minutes or three hours in order to dissolve such acetals in formalin and the solution is then cooled to normal temperature and then the insoluble part is filtered. On the contrary, according to the present invention, a small amount of a water solubilized high molecular weight substance, such as is mentioned above can be added to and easily mixed with or dissolved into the aqueous formaldehyde solution at normal temperature without requiring operations, such as heating or filtering, at all. Further, it should be noted that only when the above-mentioned water solubilized high molecular weight substance is used according to the present invention, will the desired effect be obtained and, even if the respective required amounts of the water soluble or water insoluble polyvinyl acetal and the anionic active agent are added individually to formalin or aqueous formaldehyde, no sufficient effect will be obtained. Further, once the water solubilized high moelcular weight substance to be used in the present invention is formed, it can be diluted with water at any ratio, and the adsorbed complex thus formed will not be broken.

The proper ratio of the water insoluble acetal of polyvinyl alcohol to the anionic surface active agent in order to make the water solubilized acetal is in the range of 2:3 to 1:4 by weight.

The amount of the water solubilized high molecular weight substance (the sum of the anionic surface active agent and polyvinyl acetal which sum shall be called "the amount calculated as converted to the solid part" hereinafter) added as the stabilizer to the aqueous formaldehyde solution according to the present invention is different naturally depending on the concentration of formaldehyde and the content of methanol in the aqueous formaldehyde, but it is generally less than 0.01% but more than 0.0001% by weight. Though more than 0.01% may be used, it will be uneconomical to do so.

DETAILED DESCRIPTION

The present invention shall now be explained with reference to the following illustrative examples.

Example 1

To formalin consisting of water, 37% formaldehyde and 7% methanol, there was added at 23° C. a water solubilized high molecular weight substance consisting of five parts by weight (which shall be mentioned briefly as parts hereinafter) of polyvinyl acetacetal having an acetalization degree of 60 mol percent and a polymerization degree of 1,400, which is insoluble in water and formalin, 15 parts of sodium lauryl sulfate and 80 parts of water so as to be 0.005% by weight of the above-mentioned formalin calculated as converted to the solid part. The mixture was then stored at 0° C. Even after six hours, there was seen no variation of the appearance (including the viscosity, transparency and the production of a white precipitate and the same also in the subsequent examples) of the formalin. On the other hand, when 0.003% sodium lauryl sulfate and 0.005% polyethylene glycol ($\overline{P}=10$) monostearate were added as stabilizers, and also when no stabilizer was added, in six hours white precipitates were produced.

Example 2

To separate samples of formalin containing 38% formaldehyde and 8% methanol there were added respectively (a) a water solubilized high molecular weight substance consisting of five parts of water insoluble polyvinyl formal having an acetalization degree of 35 mol percent and a polymerization degree of 1,400, 15 parts of sodium dodecyl benzene sulfonate and 50 parts of water, (b) a polyvinyl alcohol of a polymerization degree of 1,400, and (c) an acetacetal (of an acetalization degree of 17 mol percent) of a polyvinyl alcohol (of polymerization degree of 1,400) so as to be 0.004% by weight calculated as converted to the solid part. Each mixture was then stored at 0° C. In (d) no addition was also tested. The stability was as follows:

Stabilizers: Stability
A____ On the 4th day, there was no variation in the appearance.
B____ On the 2nd day, a white precipiate was deposited.
C____ Do.
D____ In six hours, a white precipitate was deposited.

Example 3

A water solubilized high molecular weight substance consisting of six parts of polyvinyl butyral having an acetalization degree of 20 mol percent and a polymerization degree of 1,000 and which was insoluble in water and formalin, 14 parts of sodium isopropyl naphthalene sulfonate and 80 parts of water was added at 20° C. to the same formalin as described in Example 2 so as to be 0.005% by weight calculated as converted to the solid part. The mixture was then stored at 0° C. Even in two weeks, no variation in the appearance was seen. On the other hand, when formalin to which no stabilizer had been added was used as a control, on the first day of storing, a white precipitate of an amorphous state was seen to have been already deposited.

Example 4

A water solubilized high molecular weight substance consisting of five parts of polyvinylacetacetal having an acetalization degree of 30 mol percent and a polymerization degree of 1,400, 15 parts of an anionic surface active agent selected from the group consisting of sodium laurate, sodium resinate, sodium oleate and sodium isobutyl naphthalene sulfonate and 80 parts of water was added at 20° C. to respective formalin samples consisting of 37% formaldehyde, 8% methanol and 55% water so as to be 0.005% by weight calculated as converted to the solid part. The mixture was then stored at 0° C.

Even in eight days at 0° C., no variation was observed in the appearance of formalin in case when any one of the above-mentioned water solubilized high molecular weight substances was added as a stabilizer. On the other hand, in the case of no addition and also in case when any one of said anionic surface active agents only was added, a white precipitate of an amorphous state was seen to have been already deposited on the first day of storing.

Example 5

Samples of polyvinylacetacetals (acetalization degree of 60 mol percent) having polymerization degrees of 100, 1,400 and 1,800, respectively, were dissolved in 20% aqueous solution of sodium lauryl sulfate and diluted with water, thus obtaining three kinds of water solubilized high molecular weight substances, respectively consisting of five parts of one of said polyvinylacetacetals, 15 parts of sodium lauryl sulfate and 80 parts of water. To separate samples of formalin consisting of 37% formaldehyde, 8% methanol and 55% water were added the respective water solubilized high molecular weight substances so as to be 0.005% by weight calculated as converted to the solid part. The mixtures (transparent aqueous solutions) were then stored at 0°C. Even in 20 days, no variation in the appearance of these mixtures was seen. On the other hand, when formalin to which sodium lauryl sulfate only had been added was used as a control, on the first day of storing, a white precipitate of an amorphous state was seen to have been already deposited.

While a particular preferred embodiment of the invention has been described, it will be apparent that the invention contemplates such changes or modifications therein which lie within the scope of the appended claims.

The embodiments of the invention in which an exclusive property or privilege is claimed are defined as follows:

1. A method of stabilizing an aqueous formaldehyde solution containing at least about 37% by weight of formaldehyde, said method comprising the steps of obtaining a water solubilized, high molecular weight, acetal stabilizer by mixing and dissolving:
    (1) a water insoluble acetal of polyvinyl alcohol selected from the group consisting of polyvinyl formal, polyvinyl acetacetal and polyvinyl butyral having a polymerization degree of about 100 to 2000 and an acetalization degree of about 25 to 95 mol percent of the hydroxyl radical of the polyvinyl alcohol, in
    (2) a concentrated aqueous solution of an anionic surface active agent selected from the group consisting of fatty acid alkali salts, alkyl sulfuric acid alkali salts, alkyl benzene sulfonic acid alkali salts, alkyl naphthalene sulfonic acid alkali salts, alkyl sulfonic acid alkali salts and alkenyl sulfonic acid salts,
    the ratio of said water insoluble acetal to said anionic surface active agent being in the range of 2:3 to 1:4 by weight, adding the water solubilized high molecular weight acetal stabilizer to said aqueous formaldehyde solution in an amount of from about 0.01% to 0.0001% by weight of the solution, the weight of the stabilizer being calculated as the sum of said anionic surface active agent and said acetal, whereby the addition of the stabilizer stabilizes the solution against the formation of a precipitate.

2. A method as claimed in claim 1, wherein said aqueous formaldehyde is a formalin containing methanol.

3. A composition of matter consisting essentially of: an aqueous formaldehyde solution containing at least about 37% by weight of formaldehyde;

a water solubilized high molecular weight acetal stabilizer formed by dissolving (1) a water insoluble acetal of polyvinyl alcohol selected from the group consisting of polyvinyl formal, polyvinyl acetacetal and polyvinyl butyral having a polymerization degree of about 100 to 2000 and an acetalization degree of about 25 to 95 mol percent of the hydroxyl radical of the polyvinyl alcohol, in (2) a concentrated aqueous solution of an anionic surface active agent selected from the group consisting of fatty acid alkali salts, alkyl sulfuric acid alkali salts, alkyl benzene sulfonic acid alkali salts, alkyl napthalene sulfonic acid alkali salts, alkyl sulfonic acid alkali salts and alkenyl sulfonic acid salts, the ratio of said water insoluble acetal to said anionic surface active agent being in the range of 2:3 to 1:4 by weight, The water solubilized high molecular weight acetal stabilizer being present in an amount of from 0.01% to 0.0001% by weight of the aqueous formaldehyde solution, the weight of the stabilizer being calculated as the sum of said anionic surface active agent and said acetal, whereby the stabilizer stabilizes the solution against the formation of a precipitate.

References Cited

FOREIGN PATENTS 374,109   6/1962   Japan.

OTHER REFERENCES

McBain, Colloid Science, 1950, pages 264–269.

Schwartz et al., Surface Active Agents, 1949, pages 307–312.

Schwartz et al., Surface Active Agents, pages 116–117, 1949.

LEON ZITVER, Primary Examiner

R. H. LILES, Assistant Examiner